United States Patent
Sullivan (10) Patent No.: US 7,183,900 B2
(45) Date of Patent: Feb. 27, 2007

(54) COUPLING CIRCUIT ARRANGEMENT FOR DATA COMMUNICATION OVER POWER LINES

(75) Inventor: Patrick Sullivan, Boeblingen (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 114 days.

(21) Appl. No.: 10/498,185

(22) PCT Filed: Sep. 11, 2002

(86) PCT No.: PCT/EP02/10155

§ 371 (c)(1),
(2), (4) Date: Nov. 15, 2004

(87) PCT Pub. No.: WO03/055096

PCT Pub. Date: Jul. 3, 2003

(65) Prior Publication Data

US 2005/0069321 A1  Mar. 31, 2005

(30) Foreign Application Priority Data

Dec. 20, 2001 (EP) .................................. 01130362

(51) Int. Cl.
*H04M 11/04* (2006.01)

(52) U.S. Cl. .............................. 340/310.01; 340/310.3; 340/310.6; 340/310.7; 370/276; 370/277; 370/278

(58) Field of Classification Search ............. 340/310.1, 340/310.3, 310.6, 310.7; 370/276, 277, 278
See application file for complete search history.

(56) References Cited

U.S. PATENT DOCUMENTS

| 5,241,283 | A | | 8/1993 | Sutterlin ....................... 330/51 |
| 5,452,344 | A | | 9/1995 | Larson ......................... 379/107 |
| 5,717,685 | A | * | 2/1998 | Abraham ..................... 370/276 |
| 5,834,973 | A | * | 11/1998 | Klatser et al. .............. 330/126 |
| 6,665,620 | B1 | * | 12/2003 | Burns et al. .................. 702/62 |

FOREIGN PATENT DOCUMENTS

| DE | 100 12 235 | 6/2001 |
| EP | 1 049 267 | 11/2000 |
| FR | 2 472 222 | 6/1981 |
| WO | WO 01 63848 | 8/2001 |

* cited by examiner

*Primary Examiner*—Tai Nguyen (57) ABSTRACT

A coupling circuit arrangement for data communication over a power line comprises a modulator/demodulator circuit for modulating data signals for transmission over the power line, and for demodulating signals which have been transmitted over the power line into data signals, a power supply circuit, and isolation means for providing galvanic isolation from the power line. The isolation means comprises light emitting elements and light detecting elements, which are arranged between the modulator/demodulator circuit and the power line. The isolation means may also be used to transmit a digital control signal which indicates the status of the power supply circuit or an overtemperature condition, or which is a transmit enable signal. The digital control signal may be encoded in the analog data signal by a digital shift in the DC bias level or by a complete removal of the DC biasing signal.

9 Claims, 7 Drawing Sheets

COUPLING CIRCUIT ARRANGEMENT FOR DATA COMMUNICATION OVER POWER LINES

This application is the National Stage of International Application No. PCT/EP02/10155, International Filing Date 11 Sep. 2002, designating the United States of America, published under PCT Article 21 (2) as WO Publication No. WO 03/055096 A1, which claims priority from European Application No. EP01130362, filed 20 Dec. 2001.

BACKGROUND OF THE INVENTION

1. Field of the Invention

The invention relates to a coupling circuit arrangement for data communication over power lines. Such a circuit arrangement is used to couple data to a power line for transmission over the power line and for receiving data may have been transmitted over the power line.

2. Brief Description of Related Developments

Communications networks are commonly used to transport digital data between devices and systems in an industrial, residential or transportation environment. The digital data can contain encoded information such as voice, video, control or status information. To transmit and receive this data some kind of physical transmission medium is required. Examples are RF, Coax, Ethernet twisted pair, telephone cables and power line cables.

In the prior art it has been suggested to use power lines to transmit and receive communication data. Examples are described in U.S. Pat. Nos. 5,241,283 and 5,452,344. The power line is a connectivity medium primarily used to transmit AC or DC power to an electronic or electrical circuit. Examples are the AC power distribution in a house or the DC voltage bus in an automobile. The power line medium is a favorable medium for data networking in these applications because it is a ubiquitous medium and the communication link implementation saves the cost of implementing additional connection cables.

Power line communication signals are typically transmitted on carrier frequencies in frequency bands allocated by national regulations. Within the allocated frequency band the transmitted digital signal is typically modulated using various schemes such as ASK (Amplitude Shift Keying), FSK (Frequency Shift Keying), Spread Spectrum techniques. The modulation function is typically performed by a modulator/demodulator integrated circuit (IC). This modulation/demodulation function may also form part of a microprocessor or microcontroller. The modulated transmit and receive signals are subsequently coupled onto the power line via a coupling circuit. In the case of power lines used to transmit AC power, the coupling circuit also has to filter out the AC power frequencies. In the case of a DC power line, the coupling circuit simply has to block the DC voltage of the power line.

Additionally in many cases the power line is distributing voltages levels, which can be considered potentially dangerous to life. To protect the user it is usual to galvanically isolate any circuitry electrically connected to the power line voltages. In some instances this may be achieved by means of the system housing or mechanical construction, but in many cases this is not a practical solution because the user has to have direct electrical access to the low voltage circuitry. In this instance it is usual to galvanically isolate the low voltage circuitry from the high voltage circuitry. In this instance the common method of achieving galvanic isolation is to use a transformer to couple the modulated signal onto the power line.

This transformer has to be able to couple a large signal current within the communication pass band. Additionally the construction of the transformer also has to meet the requirements of pertinent national and international safety requirements. These two factors together mean that the ability to reduce the physical dimensions and cost of the coupling transformer is limited.

Another problem with coupling low voltage circuitry onto the power line with a transformer is that high voltage surges or transients within the communication passband are directly coupled into the low voltage circuitry, potentially damaging not only the power line interface components but also interconnected circuitry. This problem is reduced with the use of surge protection devices however still represents a potential risk to overall system robustness.

Another method to provide galvanic isolation is to use multiple optocouplers to isolate the digital input/output between the modulator/demodulator IC and the system microcontroller. In this manner the power line modem is completely galvanically isolated from the system.

This method has the advantage that any surge transients on the power line only impinge on the power line modem components. The system low voltage circuitry is effectively protected isolating any potential surge damage just to the power line modem, significantly increasing overall system robustness.

This configuration however cannot be used in the case of system microcontrollers, which implement the modulator/demodulator function internally. In this case the microcontroller general purpose input/output ports typically need to be directly connected to the low voltage side circuitry.

Because the power line medium is intended primarily to transmit power it does not have ideal characteristics for transmitting or receiving modulated communication data, particularly in terms of line impedance and attenuation loss. To successfully transmit the modulated signal across the power line, the transceiver device must be capable of transmitting a relatively high signal power level. To satisfy this requirement, the output of the modulator circuit has to be buffered with an analogue line driver.

The analogue line driver function can be implemented in a number of ways. It can be implemented using a number of discrete components or using an integrated analog line driver IC. Alternatively it could be integrated within the modulator/demodulator IC. However, the integration of the line driver within the modulator/demodulator is impeded by the fact that the most suitable lowest cost IC technology for the modulator/demodulator function is not the most suitable for the voltage and power requirements of the line driver. Consequently combining the modulator/demodulator on the same IC results in compromises either in the function of the modulator/demodulator or the line driver circuit. For this reason commonly the line driver function is situated external to the modulator/demodulator IC.

SUMMARY OF THE INVENTION

It is thus an object of the present invention to provide a coupling circuit arrangement for data communication over a power line according to the preamble of claim 1, which avoids or reduces the mentioned problems of the prior art.

Specifically, it is an object of the invention to provide such a coupling circuit which ensures safe insulation, protects the low voltage system circuitry against potentially damaging overload conditions, and which can be designed in a space-saving manner, in particular with a high degree of integration.

According to the invention, the mentioned objects are achieved by a circuit arrangement as defined in claim 1.

The invention makes use of optoisolator technology to provide galvanic isolation. In prior art approaches using optical isolation devices to provide galvanic isolation, the isolation was positioned at the digital input/outputs of the modulator/demodulator circuit. An example is given in the article by Gerrit Telkamp: "Using Power-Line Communication for Domestic Appliances", Cologne, 7–10 Mar. 2001. The present invention differs significantly from the known approach firstly in that the integrated optical isolation is positioned between the signal modulator/demodulator and the power line. In a preferred embodiment, the optoisolated signals are of an analog type.

The invention permits a space-saving design of the coupling circuit, constitutes a reliable isolation, effectively preventing that high voltage surges or transients from the power line are coupled into low voltage circuitry. According to an embodiment of the invention, the transmit power supply does not have to be isolated so that a simple low-cost non-isolated offline power supply may be used. This is of particular advantage in systems where only small amounts of isolated power are available or in systems where the power communications facility is added at a later point in time.

In a further embodiment, the optical channel in the isolation means is also used to transmit a digital control signal which may be a transmit enable signal, or a signal indicating the status of the power supply, or a signal indicating an over-temperature condition. Preferably, the digital control signal is encoded in the analog data signal by a digital shift in the DC bias level or by a complete removal of the DC biasing signal.

BRIEF DESCRIPTION OF THE DRAWINGS

In the following embodiments of the invention will be explained in detail with reference to the drawings.

DETAILED DESCRIPTION

Figure 1:
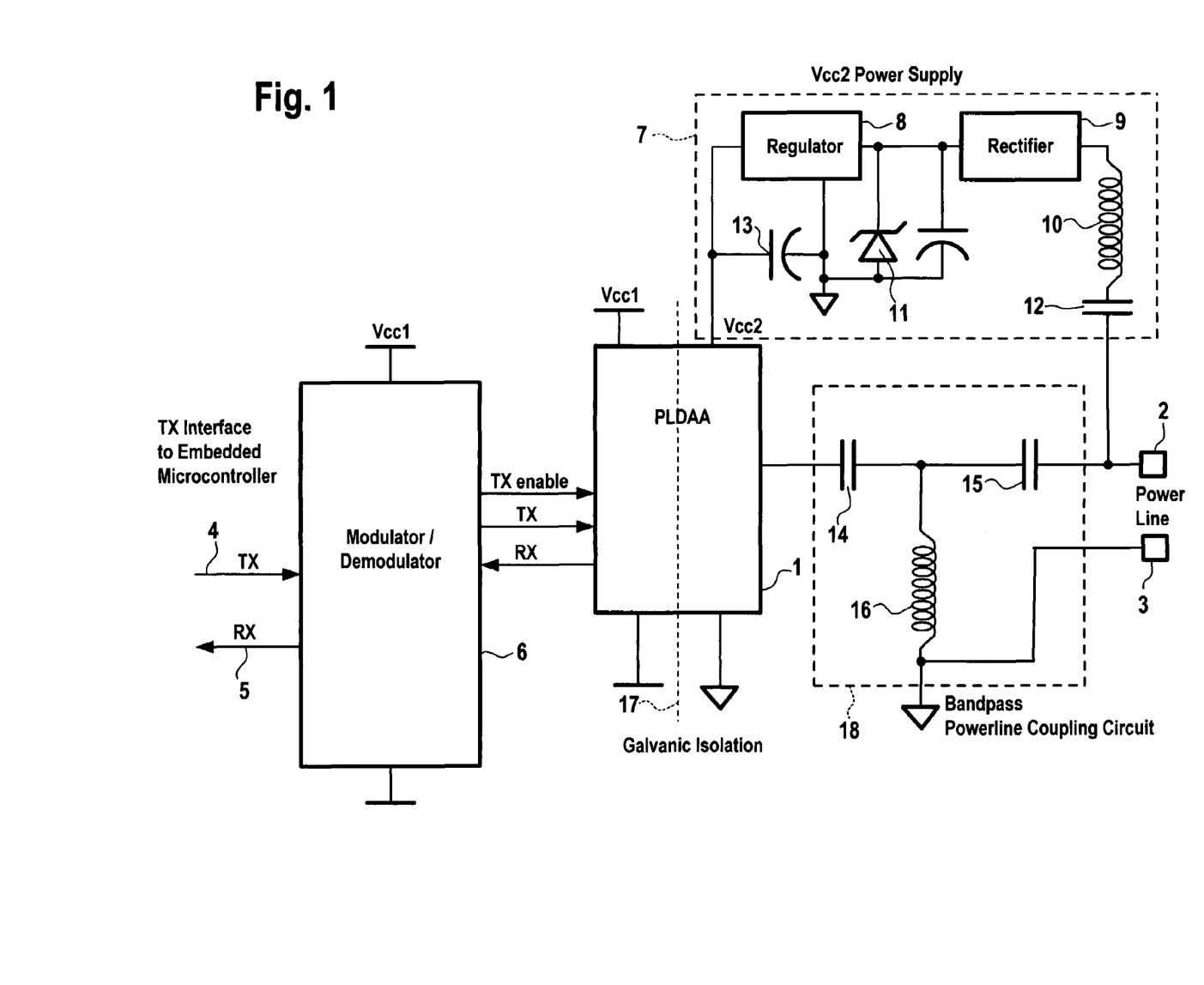
FIG. 1 is a schematic circuit diagram illustrating a first embodiment of the invention.

Referring to FIG. 1, the power line over which data are transmitted is indicated with terminals 2,3. The data which are to be coupled into the power line are supplied from external circuitry (not shown) on a transmit line 4 and the data which have been transmitted over the power line and which are to be supplied to subsequent data processing circuitry are supplied on a receive line 5. The letters TX in the drawings are used for "transmit" and the letters RX are used for "receive". The direction of signal flow is indicated with arrows. The input TX signal on line 4 is supplied to a modulator/demodulator circuit 6, and the modulated output signal is supplied to a data access arrangement 1. The dotted line 17 in block 1 represents the galvanic isolation between the input and output circuitry. The data access arrangement 1 forms an important part of the invention and will be described in more detail below.

The data access arrangement 1 is connected to a power supply circuit 7 ("Vcc2 power supply") which in turn is coupled via inductance 10 and capacitance 12 to the power line. The circuit 7 also comprises a regulator circuit 8, a rectifier circuit 9, a Zener diode 11, and a capacitance 13. Block 1 is also coupled to the power line via bandpass power line coupling 18 comprising capacitance's 14,15 and inductance 16.

Figure 2:
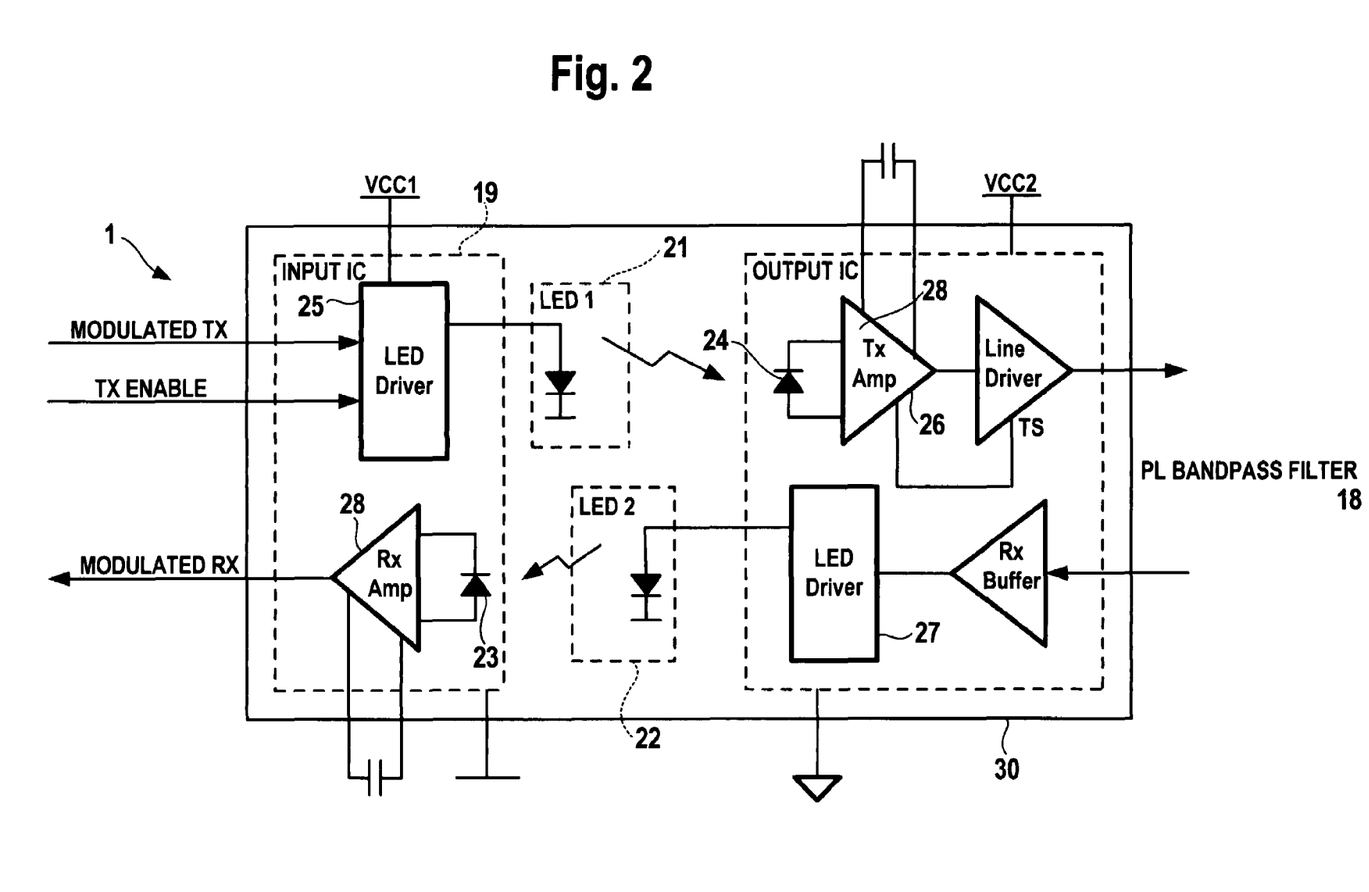
FIG. 2 is a more detailed circuit diagram of the power line data access arrangement shown in FIG. 1.

FIG. 2 shows the data access arrangement 1 in more detail. The lines with the signals "Modulated TX", "TX Enable" and "Modulated RX" are connected to the modulator/demodulator circuit 6. The arrangement 1 essentially consists of an input integrated circuit 19 ("Input IC"), an output integrated circuit 20 ("Output IC"), a light emitting diode 21 ("LED1") connected to the input IC and a light emitting diode 22 ("LED2") connected to the output IC. A photodiode 24 for detecting the light emitted from the diode 21 is arranged on the integrated circuit 20 opposite to the diode 21. A photodiode 23 for detecting the light emitted from the diode 22 is arranged on the integrated circuit 19 opposite to the diode 22. The input integrated circuit, the output integrated circuit and the photodiodes are arranged in a common package 30. The forward optical signal path transmits the modulated TX signal. The return optical signal path transmits the RX modulated signal. Integrated circuit 19 is ground referenced to the low voltage circuitry, whereas integrated circuit 20 is ground referenced to the power line.

Instead of integrating the photodiodes 23 and 24 on the integrated circuits 19 and 20, respectively, one could also use discrete photodiodes. Furthermore, instead of implementing the optical coupling by configuring the light emitting diode and the photodiode in a face-to-face configuration, one could use a reflective dome construction in which the light emitting diodes and photodetectors are mounted on adjacent leadframes side by side.

As shown in FIG. 2, the integrated circuit 19 includes a LED driver stage 25 which drives the light emitting diode 21 with a forward current. This forward current is equal to the sum of a DC biasing current and a current which is linearly related to the analogue TX input voltage. When the circuit 1 is in a transmit configuration, the light emitting diode 21 is always in a turned-on state with a continuous forward current flowing. The forward biasing DC current and the type of light emitting diode 21 are selected to ensure a linear characteristic of forward current vs. light output signal. This is necessary to minimize non-linearity and consequential harmonic distortion.

The output integrated circuit 20 includes a photodetector amplifier 26 which generates an output voltage which is linearly related to the light emission of the light emitting diode 21. The output line driver is AC coupled to the photodetector amplifier via an external AC coupling circuit which as a minimum configuration consists of a capacitor.

Figure 6:
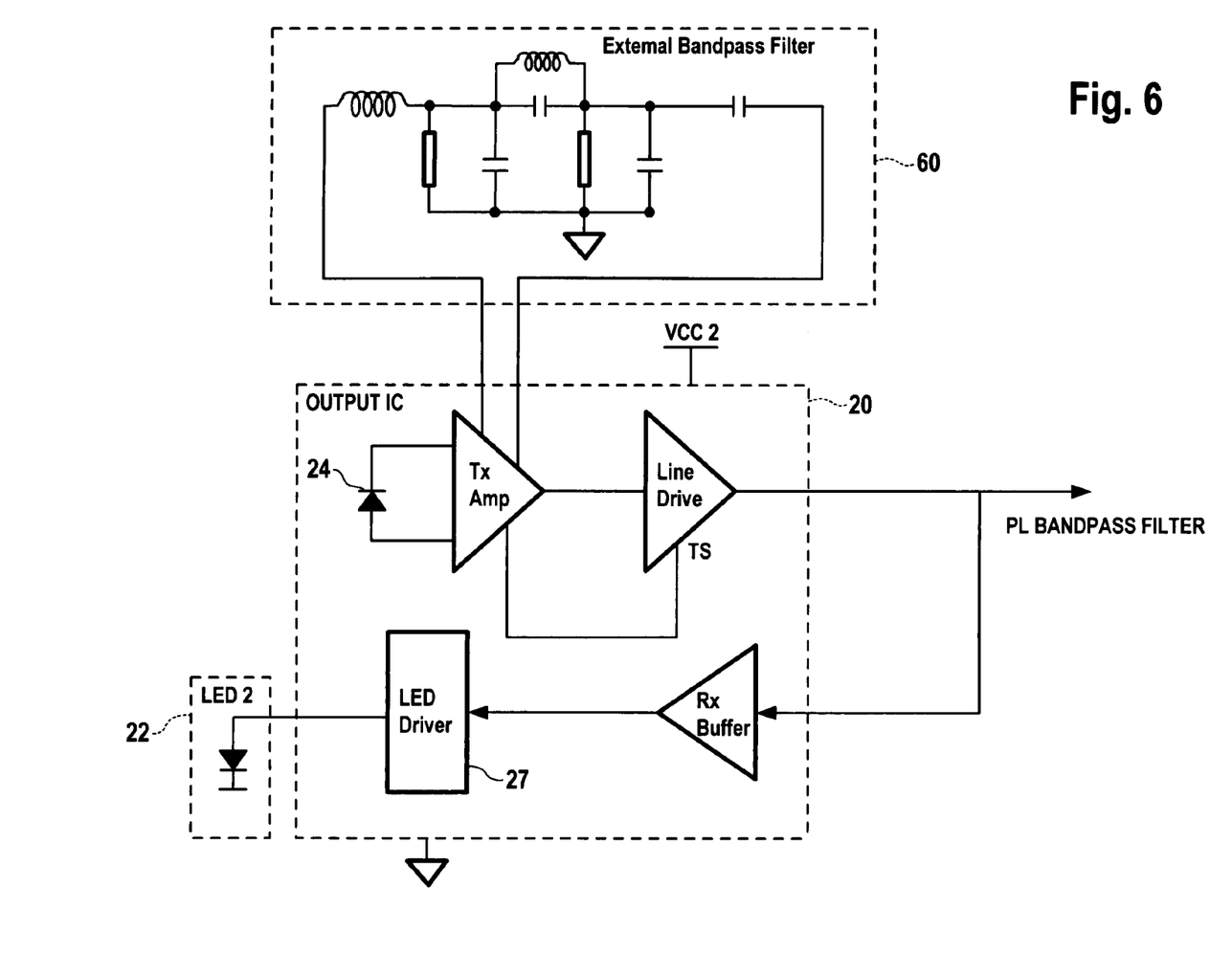
FIG. 6 illustrates a variant to the embodiments of FIGS. 2 and 3 with an external bandpass filter.

The AC coupling circuit primarily removes the DC offset voltage from the output of the photodetector amplifier. This AC coupling circuit may also include filtering circuitry to reduce residual harmonics generated in the modulator or optical channel. The output impedance of the coupling pin into the AC coupling circuit is sufficiently low to enable it to directly drive a bandpass filter without the requirement of an intermediate buffer stage. An example with an external bandpass filter 60 is shown in FIG. 6.

The integrated circuit 20 also comprises a LED driver stage 27 which drives the light emitting diode 22 with a forward current. This forward current is equal to the sum of a DC biasing current and a current which is related to the analogue RX input signal from the power line coupling circuit 18. During nominal operation the light emitting diode 22 is always in a turned-on state with a continuous forward current flowing. The integrated circuit 19 includes a photodetector amplifier 28 which generates an output voltage which is related to the light emission of the diode 22. The RX output stage is AC coupled to the photodetector amplifier via an external capacitor. Additional external filter components may also be included here to filter noise from the received signal.

Figure 3:
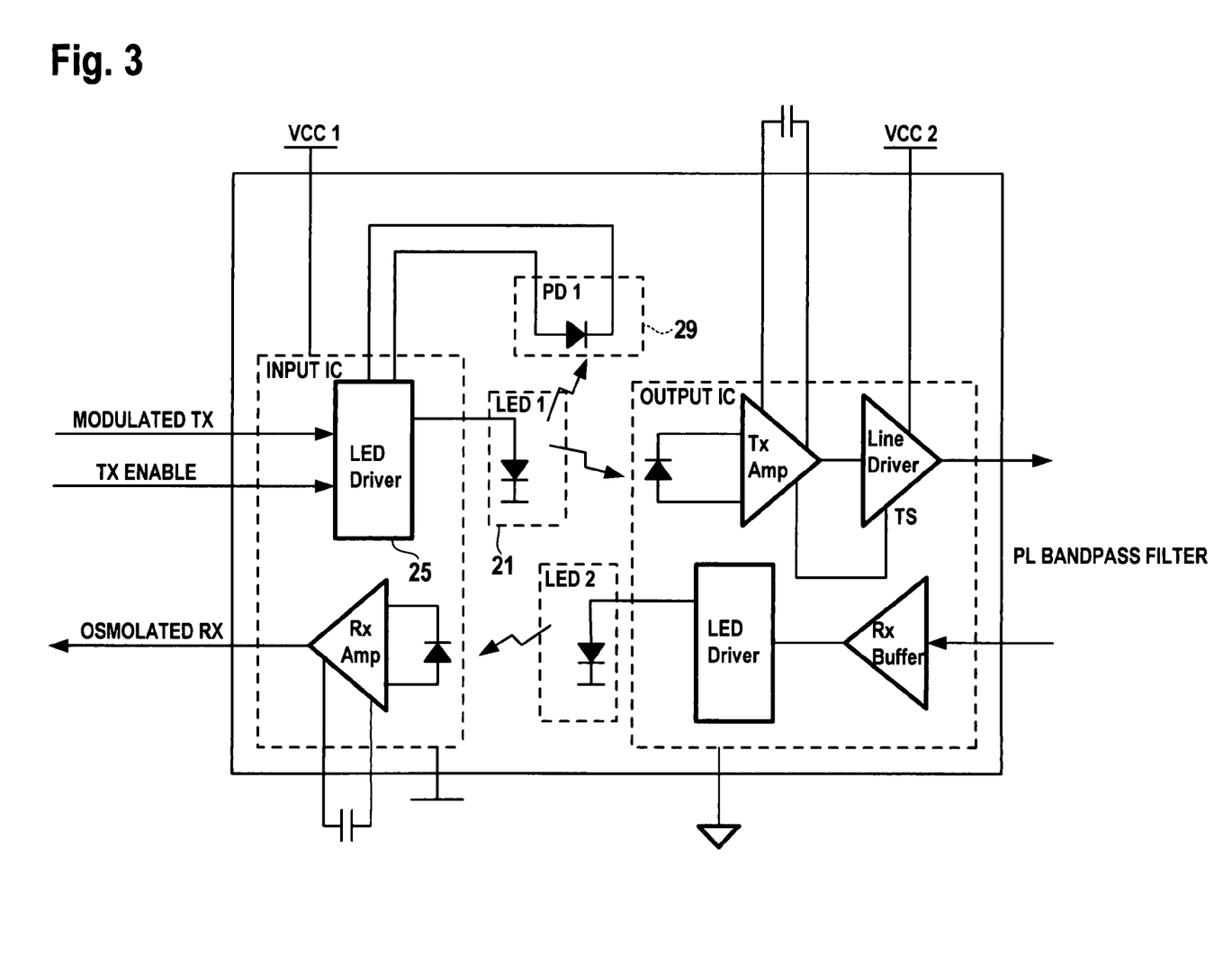
FIG. 3 shows an alternative implementation of the power line data access arrangement with improved linearity.

As mentioned above, it is desirable that the optical transmission in the transmit (TX) channel has a linear characteristic. Another embodiment of the invention, which can be implemented to further improve the linearity, is shown in FIG. 3. The essential difference to the embodiment shown in FIG. 2 is that an additional photodiode 29 is used for monitoring the output signal of the light emitting diode 21 and for providing feedback to the LED driver 25 to improve the voltage to light output linear characteristic.

An on-board regulator circuit is used in an embodiment of the invention so that it can operate over a wide Vcc2 operating range, typically 7.5 V to 18 V. It is often desirable to reduce the size and cost of the Vcc power supply. In a transformer coupled configuration the TX power supply has to be isolated. It is, however, an inherent feature of the present invention that the TX (Vcc2) power supply is not required to be isolated. This means that a simple low cost non-isolated offline power supply may be used. This type of power supply is of particular advantage in systems where only small amounts of isolated power are available, e.g. a USB (Universal Serial Bus) interface device without its own internal power supply. This is also of particular advantage in existing systems where the power communications facility is added at a later date. A low cost capacitor type power supply (FIG. 1) can easily be included as part of a power line communication module and no additional system level power supply overhead is required.

However, in implementing such an arrangement, there are some non-typical instances where an abnormal operating condition might result in the Vcc2 supply dropping below its minimum required operating level. In this instance it is a requirement that such a condition can be detected and appropriate steps be taken. Due to the galvanic isolation of Vcc2 from the low voltage circuitry, the monitoring of Vcc2 on the isolated side is problematic. This problem, however, can be solved with the inclusion of a Vcc2 voltage monitoring circuit, combined with a method of transmitting back the status of Vcc2 over the galvanic isolation. A corresponding example is shown in FIG. 4.

Figure 4:
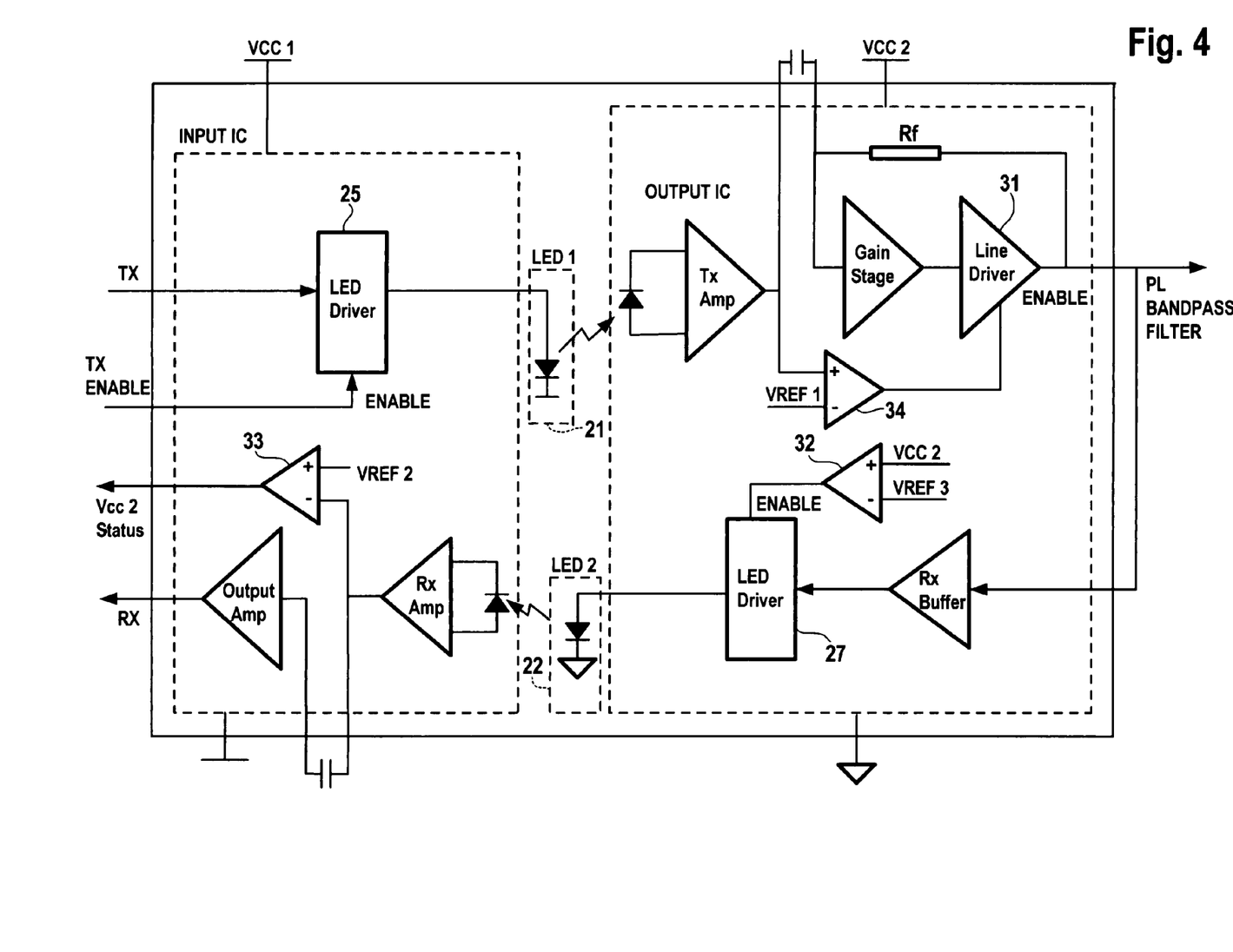
FIG. 4 shows a further embodiment of the power line data access arrangement with an under voltage lockout circuit for improved power supply.

According to FIG. 4, the Vcc2 monitoring circuit is integrated into the output circuit where it directly monitors Vcc2. If Vcc2 drops below the required minimum operating voltage level the output signal is triggered. The comparator circuit 32 of the Vcc2 monitoring circuit has hysteresis included to prevent chattering as Vcc2 passes through the trigger threshold. The comparator 32 output signal disables the RX LED2 driver 27 and biasing circuits, effectively completely turning off the light emitting diode LED2. On the isolated side of the input IC the photodetector output signal is routed to a voltage comparator circuit 33. On one input a reference voltage level VREF2 is applied, on the other input the output signal from the photodetector is applied. The reference voltage VREF2 is equivalent to a voltage level slightly above the level expected from the photodetector amplifier wih no illumination on the photodiode. Consequently, the comparator output is triggered when the driver stage 27 is disabled. The output of the comparator signal is then routed to an external connection pin on the package indicating an undervoltage condition on Vcc2. This output signal also has some other uses, for example it could be used to detect the insertion of a device into the power line and trigger an auto connect software routine.

A linear analog line driver 31 is used to drive the signal onto the power line. Integrated into the line driver are protection features to protect against overtemperature and overcurrent. In the presence of low impedance loads the peak output current needs to be limited to prevent overcurrent damage or overheating of the line driver stage. It is also important that this current limiting should not result in distortion of the output waveform with expected peak load conditions. To limit the peak current, the voltage gain of the output stage is progressively reduced as and when the peak current level reaches a peak current threshold. The current limiting threshold level is either an internally set fixed level or a level that can be set via externally connected components. The over-temperature protection includes the implementation of a circuit to monitor the output IC temperature. When the IC temperature exceeds the safe operating temperature, the over-temperature circuit disables the operation of the TX line driver. A variation of the over-temperature protection circuit might also include the wire-oring of the over-temperature signal with the Vcc2 monitoring signal. In this manner an over-temperature/over-voltage condition can be detected on the low voltage circuitry side of the galvanic isolation.

To avoid attenuating the received signal during RX mode the analog line driver must be switched to a high impedance tri-state mode. In order to meet this requirement a TX enable input control signal is included on the input IC. This input signal directly disables the LED1 driver stage 25 on the input IC effectively shutting off the LED1 forward current including the DC bias current. On the output IC the output of the photodetector is connected to one input of a comparator circuit 34, and a voltage VREF1 is applied to the other comparator input. VREF1 is equivalent to a voltage level marginally higher than the output voltage measured on the output of the photodetector stage with no illumination.

The comparator has hysteresis included to minimize the possibility of transient noise on the photodetector or LED1 driver incorrectly triggering the output. The output of the comparator enables the biasing circuitry in the TX output stage and switches the output line driver between a tri-state mode and an active mode. A notable feature of this tri-state circuit is that it avoids the requirement of an additional optical channel to transmit the tri-state signal. Another advantage of this arrangement is that the TX output automatically switches to a tri-state mode if Vcc1 is not present. This has advantages in certain applications, for example if Vcc1 is battery powered and if the battery should expire, the TX driver is automatically switched to a tri-state condition.

Figure 5:
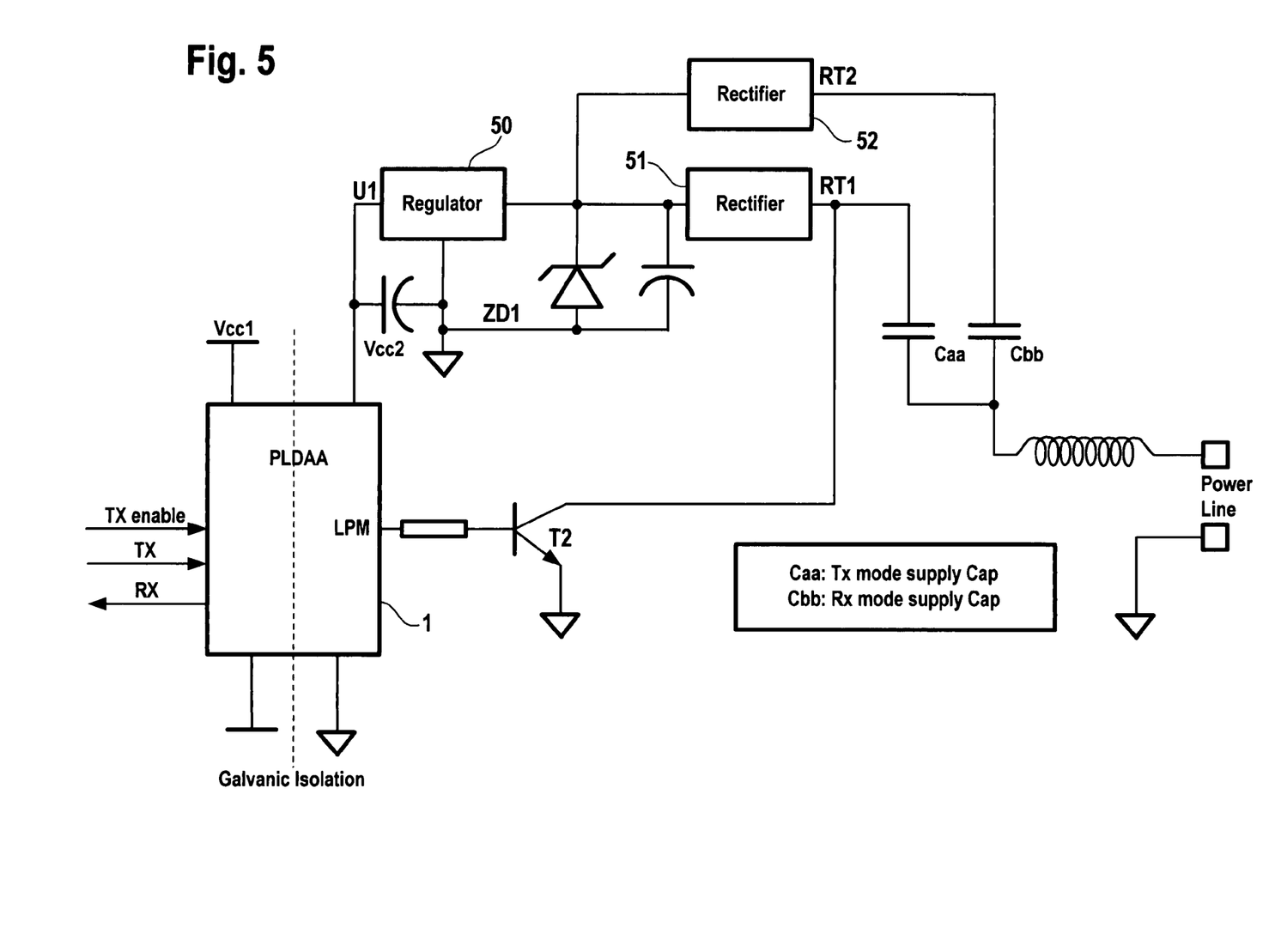
FIG. 5 shows an alternative to the embodiment of FIG. 1 with an improved power supply.

In the following, an alternative to the embodiment shown in FIG. 1 will be explained with reference to FIG. 5. The difference between these two embodiments mainly relates to the Vcc2 power supply. The primary advantage of the alternative shown in FIG. 5 is the very low power dissipation when operating the power line data access arrangement in a RX mode. It is a feature of power line modems that the transmit power supply requirements whilst operating in a transmit mode are significantly higher than when operating in a receive mode. In fact TX:RX power requirement ratios of 10:1 are not unusual. In the power supply configuration shown in FIG. 1, when operating in the RX mode, The excess power supplied by the power supply circuit is dissipated in the Zener diode. This results in a waste of power, which is undesirable in energy efficiency appliances ("green" appliances).

The circuit shown in FIG. 5 significantly reduces the wasted power by effectively switching the Vcc2 power supply into a low power mode. The signal LPM used to switch the circuit into a low power mode is derived from the internal signal in the arrangement 1 used to switch the TX stage between a transmit mode and a tri-state mode. The LPM signal turns on transistor T2 when the arrangement 1 is operating in a RX mode. Transistor T2 may be a MOS, bipolar or Darlington type transistor. The transistor may be external to the arrangement 1 as shown in FIG. 5 or integrated within the output IC itself. Connected to the collector of T2 is a capacitor Caa. The capacitor Caa sources the primary Vcc2 power requirements of the arrangement 1 when operating in the transmit mode. Turning on the transistor T2 effectively diverts the source current of Caa away from the rectifier 51 and Zener diode ZD1. In this instance the power dissipation in transistor T2 corresponds to the product of the current through Caa and the saturation voltage of T2 which is typically very small (<0.5 V). Therefore the power dissipation in T2 is considerably lower than that which would be otherwise dissipated in the Zener diode ZD1.

In order to meet the Vcc2 power supply requirements of the arrangement 1 when operating in a RX mode a parallel supply circuit is used. This parallel circuit includes a capacitor Cbb and a rectifier 52, which are connected to the input of the Vcc2 regulator and Zener diode. The capacitance value of Cbb is several times smaller than that of Caa. The capacitance ratio of these capacitors is a direct function of the ratio of the RX/TX mode power requirements of the arrangement 1. It should be noted that the inclusion of a regulator may not always be required, and Zener diode alone might suffice in some applications. Furthermore, it is understood that p type transistors could be used instead of n type transistors as described above, in which case the LPM signal would be inverted. Also, one could use an external optocoupler to transmit the LPM signal.

Figure 7:
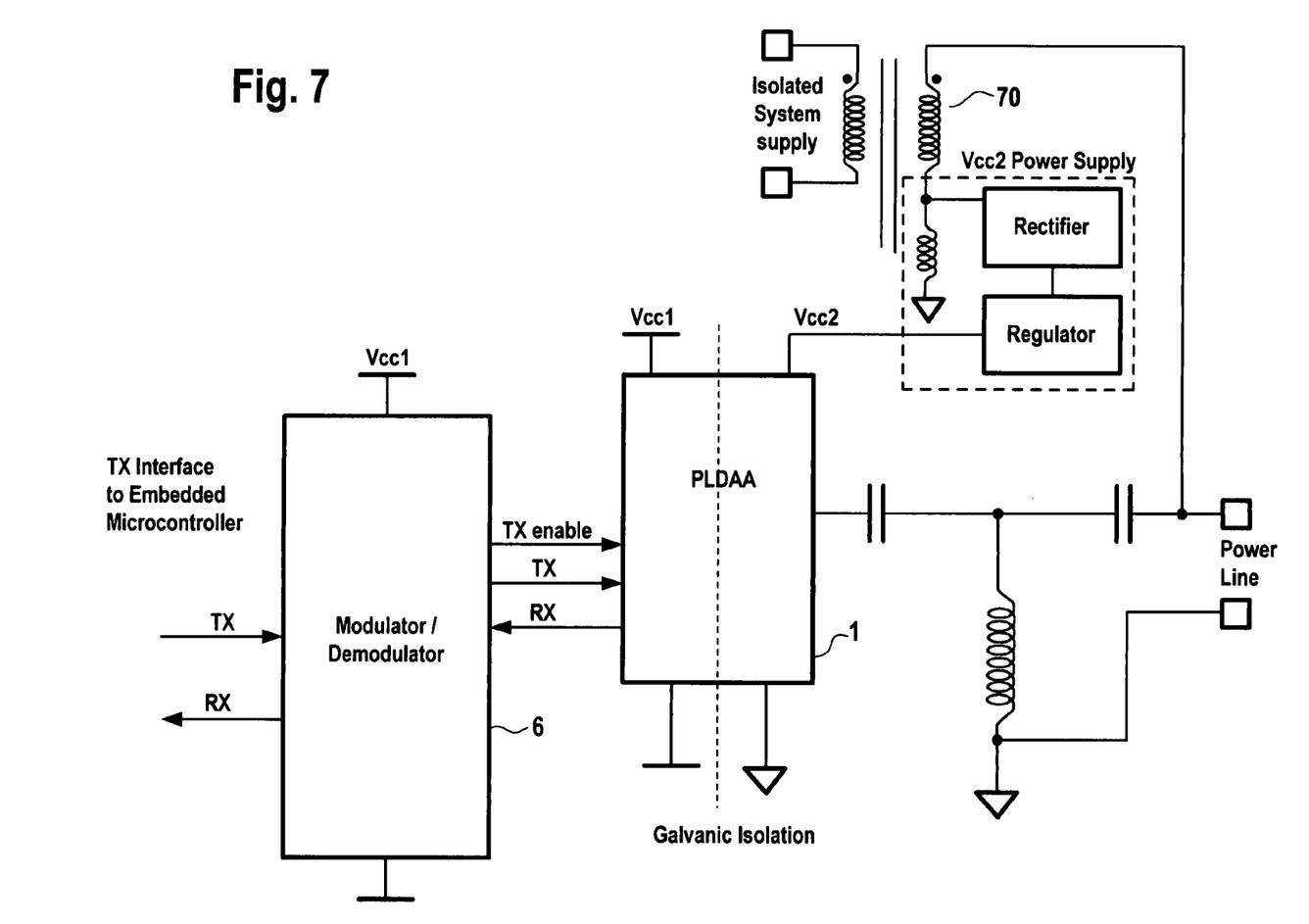
FIG. 7 illustrates an embodiment wherein a transformer is used to provide the supply voltage for the power line data access arrangement.

It should also be appreciated that Vcc2 could also be supplied from more conventional means such as the step down transformer arrangement used in a system power supply circuit. In this case the Vcc2 supply would be derived from a winding on the primary side 70 of the transformer as indicated in FIG. 7.

REFEENCE NUMERALS 1 data access arrangement
2,3 power line terminals
4 transmit line (TX)
5 receive line (RX)
6 modulator/demodulator circuit
7 power supply circuit (Vcc2 power supply)
8 regulator circuit
9 rectifier circuit
10 capacitance
11 Zener diode
12 capacitance
13 capacitance
14 capacitance
15 capacitance
16 inductance
17 galvanic isolation in block 1
18 bandpass power line coupling circuit
19 input integrated circuit
20 output integrated circuit
21 light emitting diode LED1
22 light emitting diode LED2
23 photodiode (photodetector)
24 photodiode (photodetetor)
25 LED driver stage
26 photodetector amplifier
27 LED driver stage
28 photodetector amplifier
29 additional photodiode (FIG. 3)
30 common package
31 linear analog line driver
32 UVLO comparator circuit (check!)
33 voltage comparator circuit
34 comparator circuit
35 . .
50 regulator
51 rectifier (RT1)
52 rectifier (RT2)
53 . .
60 external bandpass filter

What is claimed is:

1. A coupling circuit arrangement for data communication over a power line, comprising:
   a modulator/demodulator circuit for modulating data signals for transmission over the power line, and for demodulating signals which have been transmitted over the power line into data signals,
   a power supply circuit,
   isolation means for providing galvanic isolation from the power line, said isolation means employing optical isolation,
   wherein the isolation means which comprise light emitting elements and light detecting elements are arranged between the modulator/demodulator circuit and the power line,
   and wherein the isolation means comprise an input integrated circuit with a light detecting element for detecting optical signals corresponding to data signals from the power line, and an output integrated circuit with a light detecting element for detecting optical signals corresponding to data signals to be supplied to the power line.

2. Coupling circuit as in claim 1, additionally comprising a control circuit with a light detecting element monitoring the output of a light emitting element in the isolation means, for improving the linearity of the transmission of optical signals in the isolation means.

3. Coupling circuit in claim 1, additionally comprising a supply voltage detection circuit which is coupled to the power supply circuit at the output stags of the coupling circuit, and means for transmitting a signal which is indicative of the voltage level of the output voltage level of the power supply circuit back to the input stage of the coupling circuit via the isolation means.

4. Coupling circuit in claim 1, comprising a bandpass filter coupled to the output integrated circuit.

5. Coupling circuit in claim 1, wherein the data signals and a control signal are transmitted over the same optical channel in the isolation means, said optical channel comprising a light emitting element and a photodetector.

6. Coupling circuit as in claim 5, wherein
the data signals are transmitted analog signals by modulating the output signals of the light emitting element,
the control signal is a digital signal,
the analog data signals and the digital control signal are transmitted 20simultaneously over the same optical channel,
the digital control signal is encoded in the analog optical signal by a digital shift in the DC bias level of the analog signal applied to the light emitting element or by a complete removal of the DC biasing signal, and
the status of the digital signal is determined by a comparison of the DC bias level of the photodetector output voltage with a fixed reference voltage, or by a comparison of the minimum photodetector output voltage with a fixed reference voltage.

7. Coupling circuit as in claim 6, wherein the digital control signal is a transmit enable signal, or a signal indicating the status of the power supply, or a signal indicating a over-temperature condition, and is supplied from an output stage to an input stage of the coupling circuit via the isolation means.

8. Coupling circuit as in claim 1, comprising:
a non-isolated power supply in which a capacitor is connected in series with an AC powerline and a rectifier and a Zener diode and a regulator, and
a parallel circuit comprising a capacitor and rectifier, wherein said parallel circuit includes means for shunting current flowing through the capacitor back into the powerline in response to a signal indicating a low power or receive mode.

9. Coupling circuit as in claim 1, wherein the input integrated circuit, the output integrated circuit, and the light emitting elements are arranged in a common package as an individual device.

* * * * *

UNITED STATES PATENT AND TRADEMARK OFFICE
CERTIFICATE OF CORRECTION

PATENT NO. : 7,183,900 B2  
APPLICATION NO. : 10/498185  
DATED : February 27, 2007  
INVENTOR(S) : Sullivan It is certified that error appears in the above-identified patent and that said Letters Patent is hereby corrected as shown below:

In Column 8, line 57, Claim 3, after "circuit" insert -- as --.

In Column 8, line 59, Claim 3, delete "stags" and insert -- stage, --, therefore.

In Column 8, line 64, Claim 4, after "circuit" insert -- as --.

In Column 8, line 66, Claim 5, after "circuit" insert -- as --.

In Column 9, line 4, Claim 6, after "transmitted" insert -- as --.

Signed and Sealed this

Seventeenth Day of April, 2007

JON W. DUDAS  
*Director of the United States Patent and Trademark Office*

UNITED STATES PATENT AND TRADEMARK OFFICE
CERTIFICATE OF CORRECTION

PATENT NO. : 7,183,900 B2
APPLICATION NO. : 10/498185
DATED : February 27, 2007
INVENTOR(S) : Sullivan It is certified that error appears in the above-identified patent and that said Letters Patent is hereby corrected as shown below:

Col. 9 in Claim 6, line 5-6, delete "20simultaneously" and insert -- simultaneously --, therefor.

Signed and Sealed this

Twelfth Day of May, 2009

JOHN DOLL
*Acting Director of the United States Patent and Trademark Office*